March 10, 1970          E. N. LIDE          3,500,307

AIRCRAFT TOUCHDOWN DETECTION APPARATUS

Filed Feb. 10, 1966          3 Sheets-Sheet 1

*INVENTOR.*
EDWARD N. LIDE
BY
         Agent

INVENTOR.
EDWARD N. LIDE
BY
Agent

United States Patent Office 3,500,307
Patented Mar. 10, 1970

3,500,307
AIRCRAFT TOUCHDOWN DETECTION
APPARATUS
Edward N. Lide, Atlanta, Ga., assignor to Lockheed
Aircraft Corporation, Burbank, Calif.
Filed Feb. 10, 1966, Ser. No. 526,469
Int. Cl. G08g 5/02
U.S. Cl. 340—27                3 Claims

ABSTRACT OF THE DISCLOSURE

Apparatus positively indicating aircraft touchdown onto a landing surface to provide a signal for spoiler operation or fore other purposes. Signals produced by transducers associated with both the left and the right landing gear assemblies are supplied by balanced lines to corresponding balanced amplifiers. Signals from the transducers cause the respective balanced amplifiers to produce output signals, whereas a spurious input signal that is not isolated from electrical ground causes the balanced amplifier to produce no output signal. The touchdown detection apparatus produces an output signal only upon the concurrent presence of transducer signals indicating touchdown by both the left landing gear and the right landing gear.

---

This invention relates in general to aircraft touchdown detection apparatus and in particular to aircraft touchdown detection apparatus which provides a positive indication of aircraft touchdown without being subject to spurious indications arising from equipment malfunction or from other sources.

In the operation of modern high-speed aircraft which have relatively high landing speeds and which accordingly require a relatively long runway for safe landing, it is desirable to know exactly when the aircraft first touches down onto the runway. For the purpose of this invention, aircraft touchdown is defined as the time when landing gear support elements positioned symmetrically with respect to the aircraft roll axis bear substantially on the landing surface. Since aircraft frequently utilize a spoiler system to reduce the lift of the aircraft wing and to produce drag for the purpose of slowing down the aircraft upon landing, it is desirable to actuate the spoiler system immediately upon aircraft touchdown so as to utilize fully the effect of the spoiler system. At the same time it is essential that the spoiler system not be actuated until the aircraft has actually touched down, inasmuch as premature actuation of the spoiler system could cause an unexpectedly hard landing with possible resultant injury to the aircraft and its occupants. Spoiler system actuation, accordingly, should be controlled by an apparatus which can detect aircraft touchdown positively and which cannot give a false indication of aircraft touchdown arising from such spurious sources as voltage transients, fluctuation in the primary supply voltage or failure of a component in the touchdown detection system.

Prior art apparatus is available which provides an indication of aircraft touchdown. One example of such apparatus uses a tachometer generator mechanically coupled to at least one wheel of the main landing gear so that the output voltage of this generator is a direct function of the wheel rotational velocity. The generator output typically is supplied to an amplifier which may be biased so that the amplifier yields no output unless the input voltage exceeds a predetermined amount indicative of a predetermined minimum wheel rotational velocity. When this minimum level is reached, the amplifier provides an output and this output is utilized to actuate the spoiler system or other apparatus. A touchdown apparatus of this type however may be suscepible to false indications of the types mentioned above, and for this reason such apparatus may not be acceptable for use in modern aircraft.

According to the present invention, there is disclosed and described a touchdown detection system which gives a positive indication of aircraft touchdown only when a predetermined number of wheels of the aircraft have reached a given rotational velocity or when nonwheel landing gear has established touchdown and which system is not subject to a false indication of touchdown produced by open or short circuits in the system, introduction of spurious signals into the tachometer generator leads, or other electrical disturbances or malfunctions.

Accordingly, it is an object of this invention to provide an improved aircraft touchdown detection system.

It is another object of this invention to provide an aircraft touchdown detection system which is relatively incapable of providing a false indication of touchdown.

It is a further object of this invention to provide an aircraft touchdown detection system having fail-safe characteristics so that failure of the system or a portion thereof does not produce a false indication of touchdown.

It is still another object of this invention to provide an aircraft touchdown detection system which is substantially immune to false indications of touchdown caused by supply voltage transients of fluctuations or other spurious signals.

It is yet another object of this invention to provide an aircraft touchdown detection system which functions to actuate a system of the aircraft immediately on positive touchdown of the aircraft onto a landing surface.

The exact nature of this invention as well as other objects and advantages thereof will be readily apparent from consideration of the following specification relating to the annexed drawings in which.

Stated in general terms, this invention is used in conjunction with the actuating mechanism of an aircraft system such as the spoiler system, with the control signal for automatic spoiler actuation being derived from the output of at least one transducer associated with a landing gear wheel. The signal from this transducer is supplied by an ungrounded line to a balanced amplifier which produces an output signal only in response to a balanced input signal. The output of the balanced amplifier is used to actuate a relay or other switching device in the spoiler control circuit. Two complete systems of the type above generally described can be used, with the transducer of the second system associated with a main landing gear wheel on the side of the aircraft fuselage opposite that of the first transducer and with the switching device responsive to the output of this second system also being in series with the spoiler circuit. Moreover, a completely independent second touchdown system can be provided for redundancy purposes.

Figure 1:
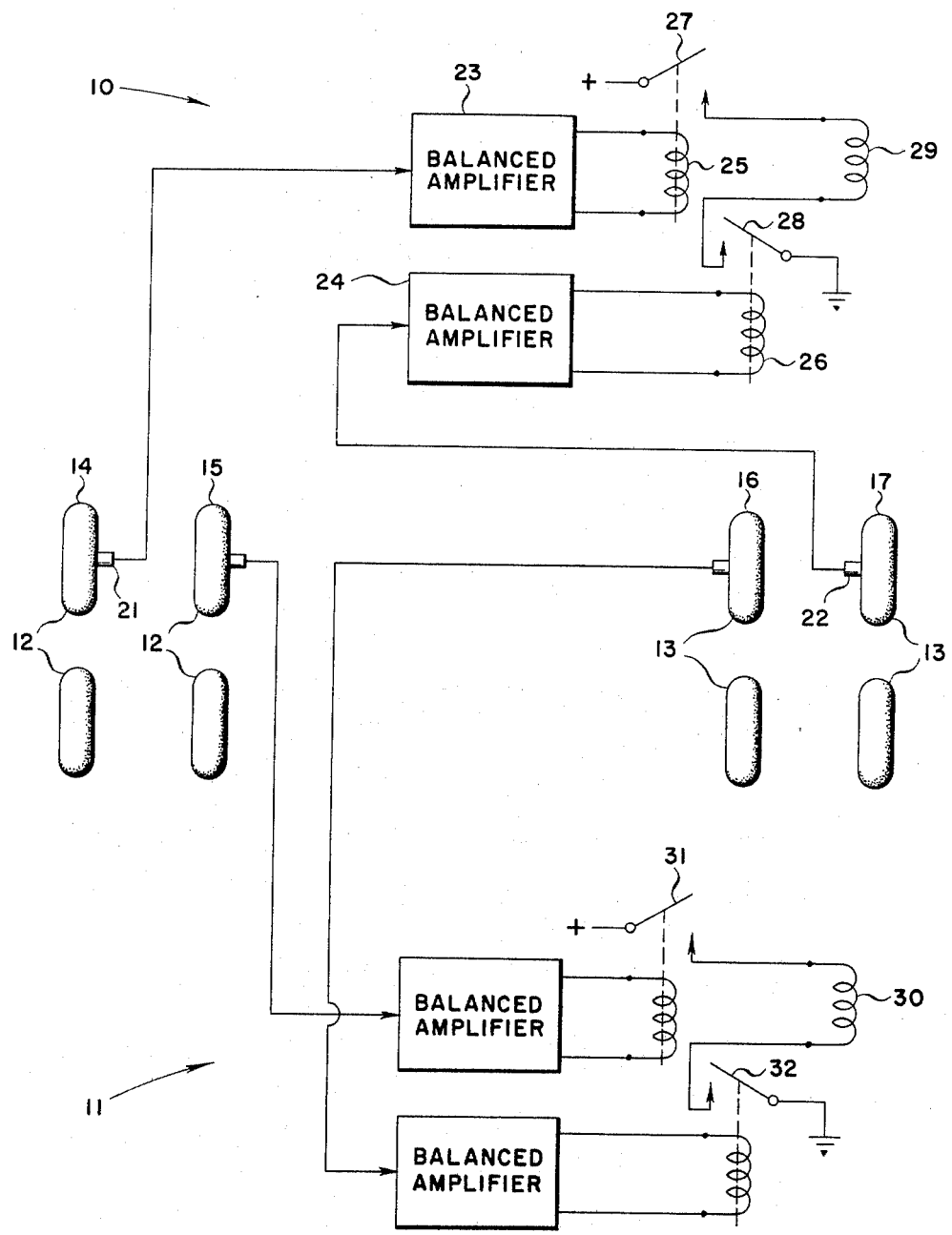
FIGURE 1 shows a block diagram of an embodiment of an aircraft touchdown detection system according to this invention.

Stated more particularly and with reference taken to FIGURE 1 of the drawings, there is shown an embodiment of this invention including a first touchdown detection system indicated generally at 10 and a second touchdown detection system indicated generally at 11. Without the intention of limiting the application of this invention thereto, each of these systems is shown associated with an aircraft main landing gear having four left wheels 12 and four right wheels 13. If the aircraft associated with these wheels is imagined to have its nose at the top of FIGURE 1 and its tail at the bottom thereof, then the wheels as viewed from above the aircraft associated with this embodiment of the invention are identifiable as follows: 14, left front outboard; 15, left front inboard; 16, right front inboard; 17, right front outboard.

Associated with each of wheels 14 through 17 is a transducer which may be a tachometer generator mechanically coupled by gearing or other suitable drive mechanisms to the respective wheel. Thus, a tachometer generator 21 is associated with left front outboard wheel 14 and a similar tachometer generator 22 is associated with right front outboard wheel 17. In the case of aircraft utilizing skis, skids, or other nonrotating landing gear elements, a suitable transducer can be associated therewith to detect the existence of a load on the gear arising from support of the weight of the aircraft. The generators associated with wheels 15 and 16, as well as certain other of the components comprising second touchdown system 11, are not designated on FIGURE 1 inasmuch as this second system and all of the components thereof may be identical with the components of the first touchdown system 10 to be described herein. Second system 11 is present only for purposes of redundancy and it will be seen that either of these two systems can provide a signal which causes actuation of the spoiler system or other utilization device.

The electrical output of tachometer generator 21 is supplied to a first balanced amplifier 23 while the electrical output of the tachometer generator 22 is supplied to a second balance amplifier 24. The outputs of balanced amplifiers 23 and 24 are used to drive relay coils 25 and 26, respectively, and these relay coils each operate a respective switch 27 and 28. Switches 27 and 28 are disposed in series with actuating coil 29 of the spoiler system or of any other system or apparatus which it is desired to operate upon aircraft touchdown. A similar and redundant actuator coil 30 associated with second system 11 also is provided as shown in FIGURE 1. It is apparent that either of actuator coils 29 or 30 will be energized only when both of the respective switches 27 and 28, or 31 and 32, associated with that coil are closed. For redundancy purposes, the spoiler system or other system to be actuated will function when at least one of coils 29 and 30 is energized.

Figure 2:
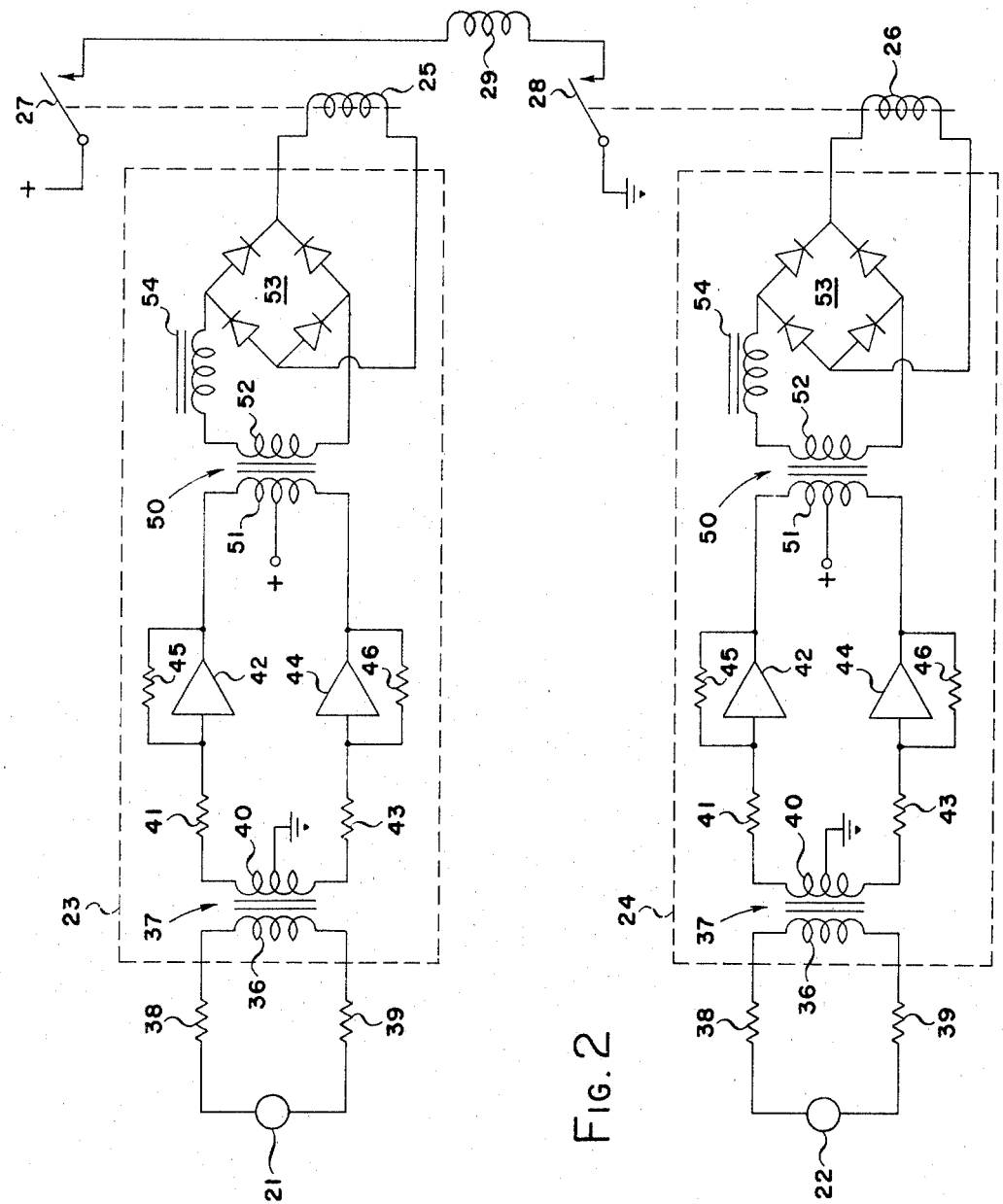
FIGURE 2 shows a schematic diagram of one channel of the embodiment depicted in FIGURE 1.

Turning to FIGURE 2 there is shown in greater detail a schematic diagram of the components comprising first touchdown system 10, where the components contained within the dashed lines correspond to balanced amplifiers 23 and 24. Tachometer generator 21 is connected to the primary winding 36 of transformer 37 through a balanced line having both sides isolated from ground. Resistances 38 and 39 are contained in series with this line to provent loading of generator 21 by primary winding 36. Transformer 37 has a center-tapped secondary winding 40 with the center tap connected to ground. One side of secondary 40 is connected through resistance 41 to the input of amplifier 42, while the other side of secondary 40 is connected through resistance 43 to the input of another amplifier 44. Each of amplifiers 42 and 44 preferably has substantially similar operating characteristics and each of these amplifiers has a feedback resistance 45 and 46 connected thereacross.

The outputs of amplifiers 42 and 44 are connected to the ends of center-tapped primary winding 51 of output transformer 50. The center tap of winding 51 is connected to a suitable source of operating power for the amplifiers. Connected in series with inductance 54 across secondary winding 52 transformer 50 is a rectifier bridge 53 which functions to rectify the output of the transformer to provide DC operating power for relay coil 25. When coils 25 and 26 are energized, closure of switches 27 and 28 enables actuator coil 29 to be energized.

The components depicted on FIGURE 2 as receiving the signal from tachometer generator 22 and producing therefrom an output signal to operate relay coil 26 are substantially identical in all respects with the corresponding components described above, and so these components associated with generator 22 have been given like reference numerals wherever applicable.

Figure 3:
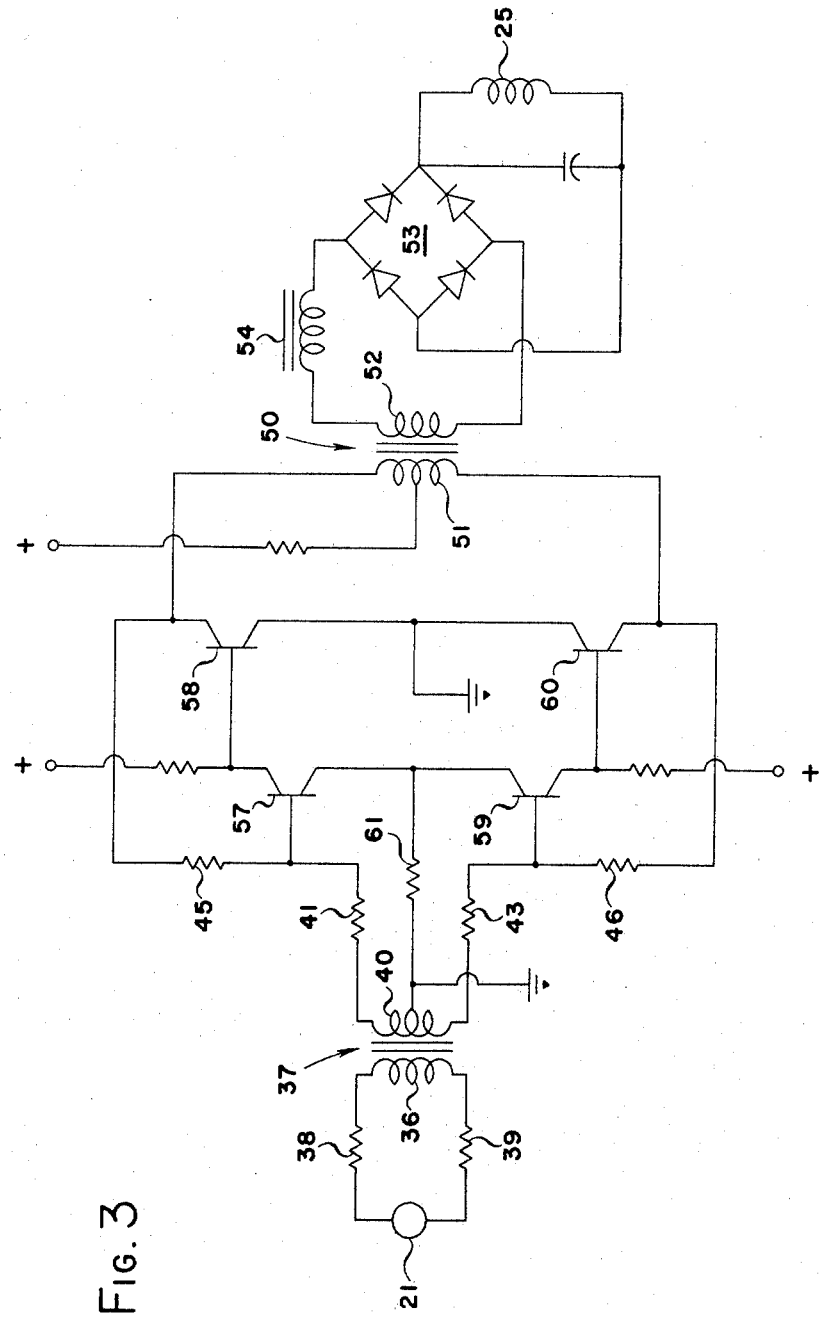
FIGURE 3 shows a schematic diagram of a balanced amplifier of the type depicted in FIGURES 1 and 2.

Turning now to FIGURE 3, there is shown in detail a schematic diagram of the circuitry comprised by the paired amplifiers 42 and 44. Amplifier 42 includes a transistor amplifier 57 directly coupled to one side of secondary 40. The base of a second transistor 58 is directly coupled to the collector of transistor 57 and functions as an emitter follower with the emitter of transistor 58 being directly connected to one side of primary winding 51. In carrying out the theme of a balanced amplifier, amplifier 44 similarly includes a transistor 59 directly coupled to the other side of secondary winding 40 and an additional transistor 60 directly coupled to transistor 59 and functioning as an emitter follower as associated with the other side of primary winding 51.

The emitters of transistors 57 and 59 are connected together through resistance 61 to ground, and the collectors of transistors 58 and 60 are connected to ground. The values of the circuit components comprising balanced amplifier 23, as well as those components comprising the other balanced amplifiers, are chosen such that the balanced amplifiers produce an output only in resonse to the presence of a signal on the balanced input appearing across the primary 36 of transformer 37 and resulting from operation of tachometer generator 21. In the absence of such a signal or in the presence of an unbalanced input signal taken with respect to ground potential, no output is produced by the amplifier.

In describing the operation of this invention, it should be remembered that the output signal produced by the tachometer generators is isolated from ground potential. Thus, this output as applied to primary winding 36 produces a differential voltage with respect to ground as seen at the bases of transistors 57 and 59 so that the conductivity of these transistors is rendered unequal. The resulting inequality of current flowing in the segments of primary 51 of transformer 50 causes current to be induced in secondary winding 52 thereof, and this current is rectified in bridge 53 to cause operation of relay coil 25.

To the contrary, if the voltage applied to the primary 36 of transformer 37 is a common mode signal, a signal taken with reference to the common or ground potential, then the signals with respect to ground as seen at the bases of transistors 57 aid 59 are equal. The resulting equal current drawn by these transistors causes the primary current in each segment of center-tapped winding 51 to be equal, with the result that there is no output current induced in secondary winding 52. This latter event could occur, for example, where the electrical cable connecting the generator 21 with the composite amplifier 23 were to become damaged so as to permit entry of a spurious common mode voltage either through inductive coupling or through direct wire contact.

Since each of the balanced amplifiers produces an output signal that is a function of the differential input thereto, fluctuations or transient variations in the power supplied to these amplifiers has little or no effect on the output as supplied to the relay coils 25 and 26. The feedback provision in each of amplifiers 42 and 44 adds voltage gain stability to each of these amplifiers so that the overall response of the system is additionally enhanced.

The various components of this invention are chosen such that when the signal from the tachometer generator reaches a predetermined level corresponding to a certain ground speed the relay coil corresponding to that tachometer generator is energized. As seen from FIG- URE 1, both tachometer generator 21, corresponding to left front outboard wheel 14, and tachometer generator 22, corresponding to right front outboard wheel 17, must produce the required output signal before actuator coil 29 is energized. Thus, both the left side and the right side of the main landing gear must be firmly disposed on the runway before the spoiler system can be actuated to lessen the lift and increase the drag of the aircraft wing. The presence of a completely separate system 11 responsive to simultaneous touchdown of the left front inboard and right front inboard wheels provides complete redundancy in the event of total failure of part or all of one of these systems.

An additional advantage flowing from the use of a balanced system as disclosed herein is found in the fact that component failure of an amplifier, including either a short circuit or an open circuit condition, does not cause erroneous actuation of the spoiler system. If it is assumed for example that there is a component failure causing a gross unbalance in the emitter currents of transistors 58 and 60, this failure causes the core of transformer 50 to saturate as a result of the excessive unbalanced primary current. This saturated condition renders transformer 50 insensitive to transients of a polarity which would tend to increase the flux and only slightly responsive or completely unresponsive to transients which would tend to decrease the flux. In this regard, it should be noted that the relay coils 25 and 26 require a finite amount of energy to cause relay pull-in, and the presence under conditions of amplifier failure of a transient of sufficient magnitude and duration to unsaturate the transformer and cause actuation of relay coil 25 occurring concurrently with actuation of relay coil 26 arising from some other event is an extremely unlikely set of circumstances. The presence of inductance 54 in the output circuit provides added transient rejection resulting from the charging time of this inductance.

What is claimed is:

1. Apparatus responsive to the occurrence of aircraft touchdown comprising:
   first transducer means operatively associated with a first portiton of an aircraft landing gear to produce a signal that is a function of touchdown of said first portion of said gear;
   second transducer means operatively associated with a second portion of an aircraft landing gear to produce a signal that is a functiton of touchdown of said second portion of said gear;
   first amplifier means receiving the signal produced by said first transducer means;
   second amplifier means receiving the signal produced by said second transducer means;
   first circuit controlling means responsive to the output from said first amplifier means;
   second circuit controlling means responsive to the output from said second amplifier means; and
   a controlled circuit interconnected with both of said first and second circuit controlling means such that said controlled circuit is responsive only to the simultaneous occurrence of signals indicating touchdown of both of said first and second landing gear portions.

2. Apparatus as in claim 1 wherein:
   each of said first and second amplifier means comprises a balanced amplifier arrangement including a first amplifier portion and a second amplifier portion,
   the signals produced by each of said transducer means being isolated from a common electrical potential point and being supplied to said amplifier portions of the respective said balanced amplifier arrangements in such a way that a signal of a given polarity produced by a one of said transducer means yields an input signal to said first amplifier portion opposite in polarity to the corresponding input signal to said second amplifier portion.

3. Apparatus as in claim 2 further comprising:
   an output transformer associated with each of said balanced amplifier arrangements, each of said output transformers having a center-tapped primary winding and a secondary winding,
   the output signal from said first amplifier portion being supplied to one side of said primary winding of a respective one of said output transformers and the output signal from said second amplifier portion being supplied to the other side of said primary winding of said respective one of said output transformers,
   the center-tap of each of said output transformers being connected to a source of amplifier-operative power taken with respect to said point of common electrical potential, and
   the secondary winding of each said output transformer being connected to supply operative power to a respective one of said first and second circuit controlling means.

References Cited

UNITED STATES PATENTS

| | | | |
|---|---|---|---|
| 3,192,503 | 6/1965 | Lang | 340—27 |
| 3,276,256 | 10/1966 | Rudasill et al. | 340—271 |
| 3,339,866 | 9/1967 | Paluka et al. | 244—113 |

JOHN W. CALDWELL, Primary Examiner

H. S. COHEN, Assistant Examiner

U.S. Cl. X.R.

340—268, 271